United States Patent [19]

Kito et al.

[11] Patent Number: 4,880,092
[45] Date of Patent: Nov. 14, 1989

[54] TRANSMISSION OPERATING APPARATUS FOR AUTOMATIC TRANSMISSION

[75] Inventors: Shozo Kito, Aichi; Shoichi Harada, Gifu; Hajime Imai, Aichi; Hisatoshi Ohta, Aichi; Masamitsu Suzuki, Aichi; Tadao Muramatsu, Aichi, all of Japan

[73] Assignees: Kabushiki Kaisha Tokai-Rika-Denki-Seisakusho; Toyota Jidosha Kabushiki Kaisha, both of Japan

[21] Appl. No.: 296,994

[22] Filed: Jan. 13, 1989

[30] Foreign Application Priority Data

Jan. 14, 1988 [JP] Japan .................................... 63-3951
Jan. 14, 1988 [JP] Japan .................................... 63-3952

[51] Int. Cl.4 .............................................. B60K 20/04
[52] U.S. Cl. .................................... 192/4 A; 192/4 C; 192/4 R; 74/475; 74/483; 74/878
[58] Field of Search ........................ 192/4 A, 4 C, 4 R; 74/475, 483, 898

[56] References Cited

U.S. PATENT DOCUMENTS

| 3,859,828 | 1/1975 | Ibuka et al. | 70/252 |
| 3,942,614 | 3/1976 | Thompson | 192/4 A |
| 4,304,112 | 12/1981 | Osborn | 74/475 |
| 4,473,141 | 9/1984 | Mochida | 192/1 |
| 4,474,085 | 10/1984 | DeVogelaere et al. | 74/878 |
| 4,520,640 | 6/1985 | Kramer | 192/252 |
| 4,610,179 | 9/1986 | Parker | 74/475 |
| 4,671,085 | 6/1987 | Yamaguchi et al. | 70/248 |
| 4,724,722 | 2/1988 | Beauch et al. | 74/850 |
| 4,768,610 | 9/1988 | Pagel et al. | 192/4 A |

FOREIGN PATENT DOCUMENTS 53-45573 1/1975 Japan .
50-54733 5/1975 Japan .
56-19451 2/1981 Japan .
57-42424 3/1982 Japan .
57-134331 8/1982 Japan .
57-148222 9/1982 Japan .
57-163427 10/1982 Japan .
59-137234 8/1984 Japan .
59-176253 11/1984 Japan .
60-20447 2/1985 Japan .
60-20448 2/1985 Japan .
60-23427 2/1985 Japan .
60-135352 7/1985 Japan .
61-143825 7/1986 Japan .
61-50812 11/1986 Japan .
62-20343 5/1987 Japan .
62-27925 7/1987 Japan .

Primary Examiner—Leslie A. Braun
Assistant Examiner—Nicholas Whitelaw
Attorney, Agent, or Firm—Finnegan, Henderson, Farabow, Garrett & Dunner

[57] ABSTRACT

A transmission operating apparatus for automatic transmission wherein, when a shift lever of the automatic transmission is shifted to a specific position such as a parking position, a detent pin provided for the shift lever is engaged with a movable body and is moved to a first position so as to be engaged with detent means so that the shift to another shift position is prevented. A lock is engaged with the movable body which has been moved, together with the detent pin, to the first shift position so that the lock means cannot be separated from the movable body if a driver does not perform any special operation such as footing the brake or the like. Therefore, the movable body cannot be moved to the second position, and the shift lever cannot be moved to another shift position. The movable body is positioned at the second position when the shift lever is positioned at another shift position, while the same is engaged with the detent pin immediately after the shift lever is operated to the specific position.

20 Claims, 14 Drawing Sheets

TRANSMISSION OPERATING APPARATUS FOR AUTOMATIC TRANSMISSION

BACKGROUND OF THE INVENTION

The present invention relates to a transmission operating apparatus for an automatic transmission for vehicles.

DESCRIPTION OF THE RELATED ART

Conventional apparatus disclosed in U.S. Pat. No. 4,671,085, Japanese Utility Model Application Laid-Open No. 57-42424 and Japanese Utility Model Application Laid-open No. 59-176253 are arranged in such a manner that, when a shift lever for operating an automatic transmission is moved from a parking position to another shift position, the shift lever cannot be moved if a special operation is not performed by a driver.

The above described apparatus are arranged in such a manner that a lock means blocks movement of a detent pin provided for the shift lever after the shift lever has been moved to the parking position, while, the shifting operation is enabled when, for example, a brake lever is footed, by opening a passage of a detent pin by the lock means.

However, in the apparatus of the type described above, since the locking means blocks the passage of the detent pin to the parking position even if the shift lever is at another position than the parking position, an operation needs to be performed that this lock means is released so as to secure the passage of the detent pin when the shift lever is intended to be moved to the parking position. On the other hand, in a case where the structure is arranged in such a manner that the above-described type of special operation does not need to be performed, the locking means needs to be operated by detecting the movement of the detent pin to the parking position. It leads to a fact that such structure becomes too complicated.

Furthermore, in the above described apparatus of the type described above, since the movement of the detent pin in the parking position region is directly detected by a limit switch, such detection cannot be correctly performed due to, for example, a mounting error.

An object of the present invention is to provide a transmission operating apparatus which is capable of correctly detecting the movement of a detent pin, assuredly limiting the movement of the detect pin only with a simple structure, and making the operation of the shift lever to the parking position easy to be performed.

SUMMARY OF THE INVENTION

According to the present invention, the structure is so arranged that, when a shift lever is moved to a predetermined position such as a parking position, a detent pin secured to the shift lever is engaged with a movable body. The movable body moves, together with the detent pin, from a second position to a first position within the region of the predetermined position. Although the shift lever cannot be moved to another shift position if the detent pin is not returned from the first position to the second position, a locking means interlocks the movable body disposed at the first position so that the detent pin is restricted with the movable body. Therefore, a driver needs to operate a brake or the like to release the locking means for the purpose of enabling for the movable body to be moved. When the movable body is positioned at the first position, a detecting means assuredly detects the presence of this movable body so that movement of the locking means is assuredly enabled by footing the brake.

When the shift lever returns to a predetermined position after it has been moved from a predetermined position to another shift position, any special operation does not needs to be performed since the movable body is positioned at a position corresponding to the position of the detent pin. Therefore, the shift lever can be shifted to the predetermined shift position.

DESCRIPTION OF THE PREFERRED EMBODIMENT

A first embodiment of the present invention will now be described with reference to FIGS. 1 to 9.

Figure 1:
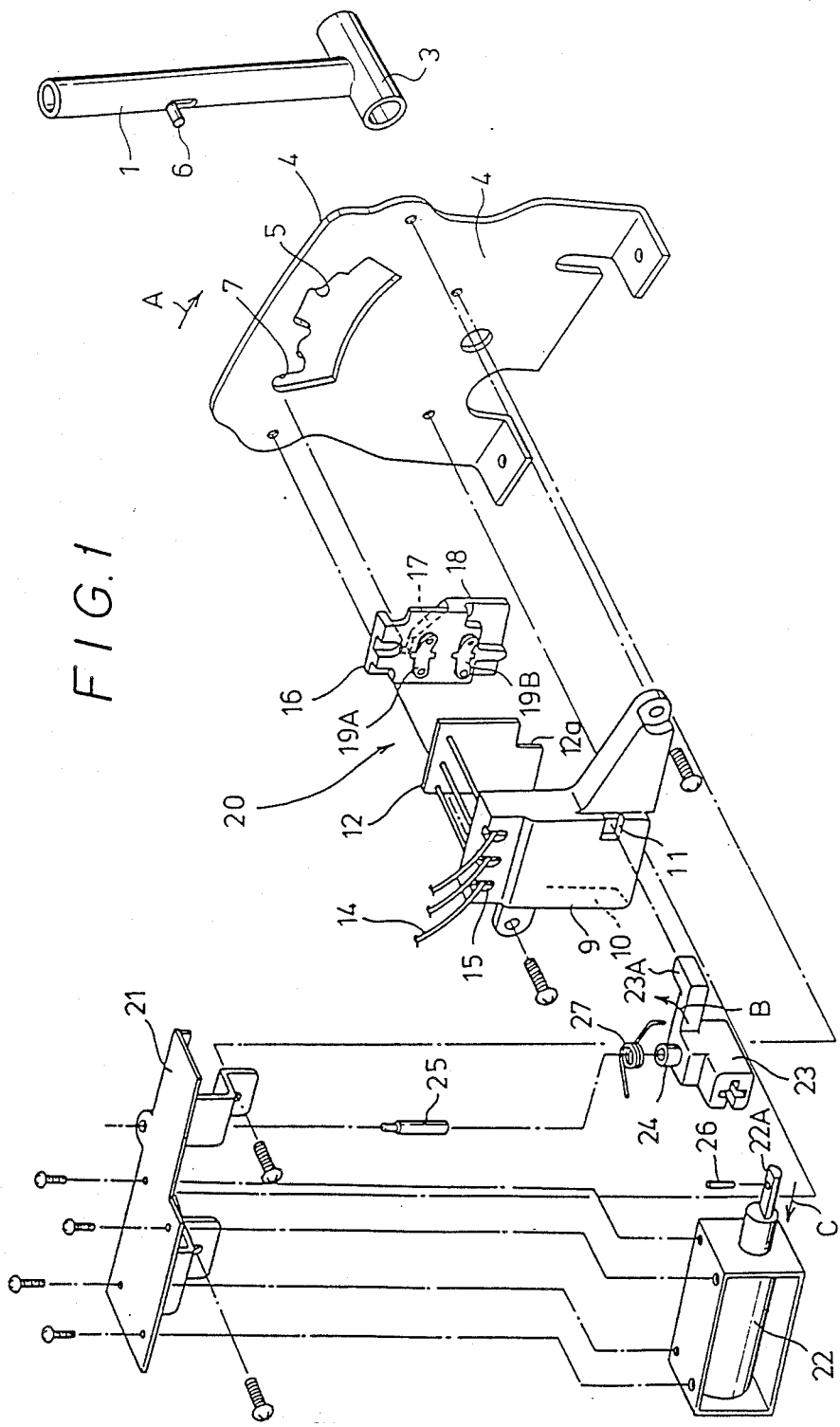
FIG. 1 is an exploded perspective view of a first embodiment of an automatic transmission in the present invention.
Figure 2:
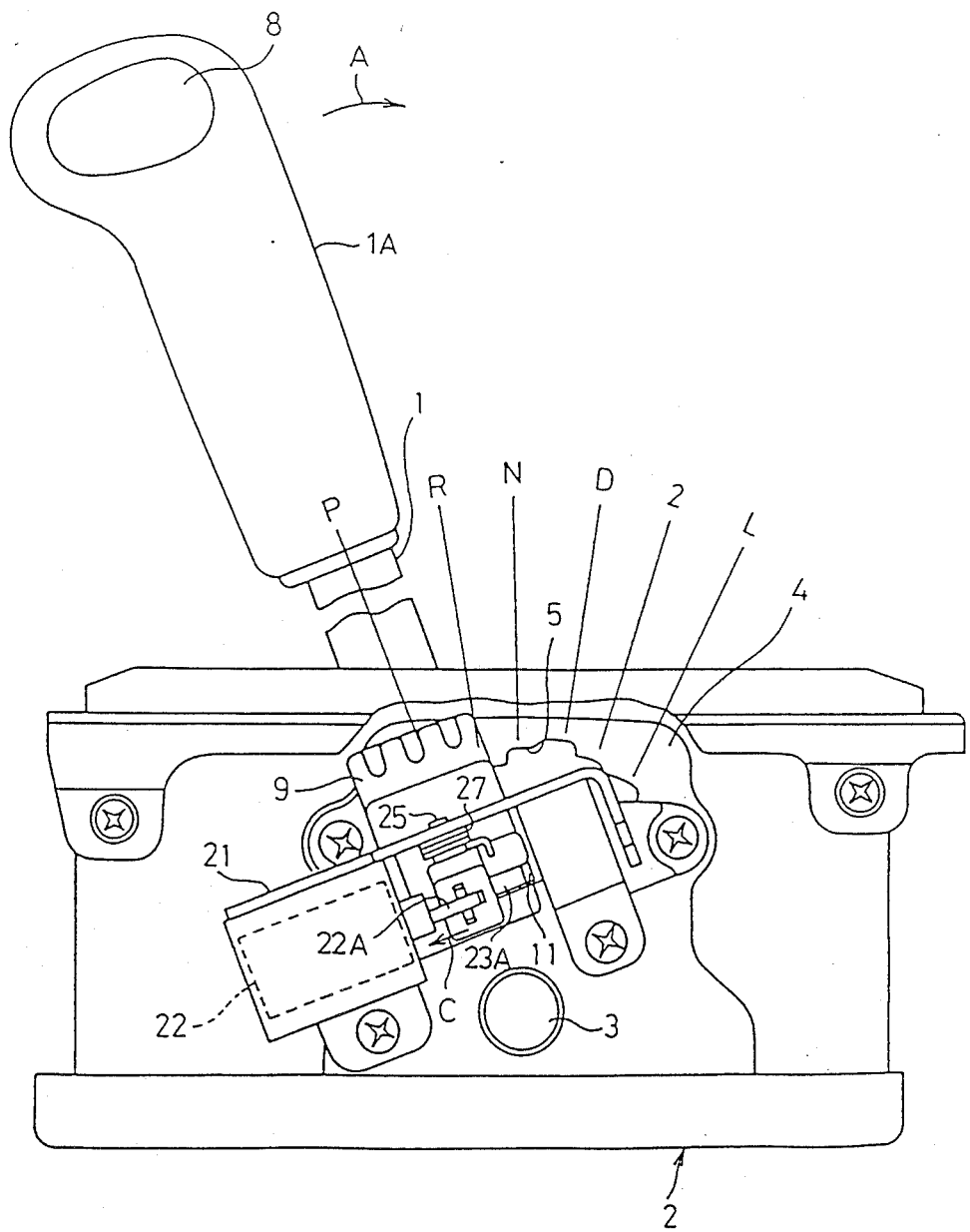
FIG. 2 is a partially broken side elevational view illustrating the first embodiment of the present invention.

As shown in FIGS. 1 and 2, a shift lever 1 is provided in such a manner that the same can be moved in the direction designated by an arrow A and also in the reverse direction of the arrow A relative to a shaft 3 secured to a frame 2, the shift lever being used for controlling an hydraulic circuit for a transmission (omitted from illustration). A saw-shaped securing hole 5 extending along the direction of the movement of the shift lever 1 is formed in a detent plate 4 which is provided to stand from the frame 2. The securing hole 5 is arranged, in association with a detent pin 6, to limit the range through which the shift lever moves when the shift lever 1 is shifted to a parking mode "P", reverse mode "R", neutral transmission mode "N", automatic transmission mode "D", "2" when the transmission is at the second gear, and "L" when the transmission is at the low gear. A lock recessed portion 7 which is in the form of a relatively deep cut in the securing hole 5 is formed in the securing hole 5 at the position corresponding to the position "P" at which the vehicle is not driven and is a specific non-drive position. The detent pin 6 perpendicularly projects from the shift lever 1, is arranged in such a manner that the same can be moved in the axial direction of the shift lever 1, and also is urged in the direction of a knob 1A of the shift lever 1. The detent pin 6 is arranged in such a manner: when a button 8 provided on the knob 1A of the shift lever 1, the detent pin 6 is moved downward so that the engagement of the same with each of the engagement surfaces corresponding to the positions is released. On the other hand, when the pressure applied to the button 8 is released, the detent pin 6 moves upward so that the detent pin 6 is made engage with one of an engagement surface in the securing hole 5.

Figure 3:
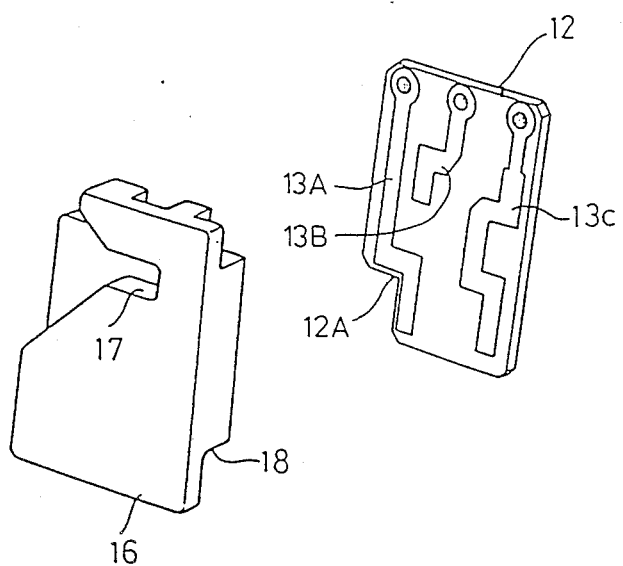
FIG. 3 is a perspective view of a movable body and a printed substrate.

A holder 9 is fastened and secured to the side surface of the detent pin 4. This holder 9 is provided with an accommodating portion 10 having an opening in the side surface thereof and which confronts the detent plate 4 and another opening in the lower surface thereof. Furthermore, the accommodating portion 10 is provided with an opening 11 in the right lower portion thereof. In addition, a printed circuit 12 is fitted into and secured to the inner surface of the accommodating portion 10. A cut portion 12A is formed in the printed circuit 12 at the position corresponding to the position of the opening 11. On the side surface of the printed circuit 12 on the confronting surface to the detent plate 4, three fixed contacts 13A, 13B and 13C are, as shown in FIG. 3, provided. Each of lead wires 14 to be connected to the corresponding fixed contacts 13A, 13B and 13C are arranged outside through an opening 15 formed in the upper portion of the accommodating portion 10.

A movable body 16 is disposed between the printed substrate 12 and the detent plate 4 in such a manner that the movable body 16 is accommodated in the accommodated portion 10. As a result, the movable body 16 is enabled to move along the line defined by the shaft 3 and the lock recessed portion 7 in the region between the printed substrate 12 and the detent plate 4.

A securing groove 17 facing, in FIG. 1, to the right and confronting the securing hole 5 is provided in the upper side portion of the detent plate 4 (see FIG. 3). The securing hole 17 can tightly accommodate the detent pin 6, and has a gradually-widened inlet portion so as to serve to guide the detent pin 6. The movable plate 16 is also provided with a securing stepped portion 18 in the right lower portion thereof to correspond to the side surface of the printed substrate 12.

Figure 4:
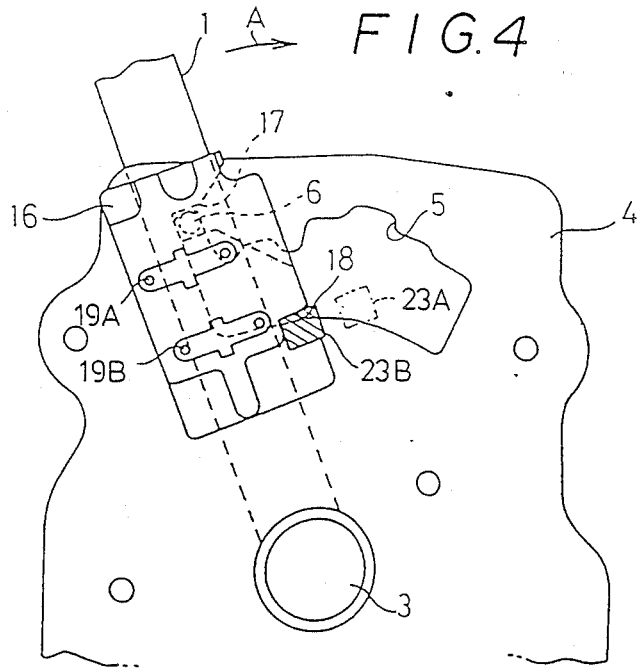
FIG. 4 is a side elevational view of the movable body and the detent plate at lock position.

The movable body 16 is arranged to move between a lock position in the upper portion in FIG. 4 (first position) and a lower lock release position (second position) together with the detent pin 6 with the detent pin 6 accommodated in the securing groove 17 thereof when the shift lever 1 is positioned at the position "P". At the lock position, the detent pin 6 is fitted into the lock recessed portion 7 so that the shift operation of the shift lever 1 is prevented, while the detent pin 6 is separated from the lock recessed portion 7 at the lock release position so that the shifting operation can be enabled. On the side surface of the movable body 16 confronting the printed substrate 12, two movable contacts 19A and 19B are provided which are brought into contact with and released from the fixed contacts 13A, 13B and 13C when the movable body 16 is moved. As a result, a detection switch 20 is formed by the fixed contacts 13A, 13B, and 13C and the movable contacts 19A and 19B. The detection switch 20 is connected to an "ON" switch SW1 of the ignition circuit and an ACC switch SW3 (see FIG. 6) of an ignition accesary circuit (ACC circuit) which are operated by an ignition key.

Figure 6:
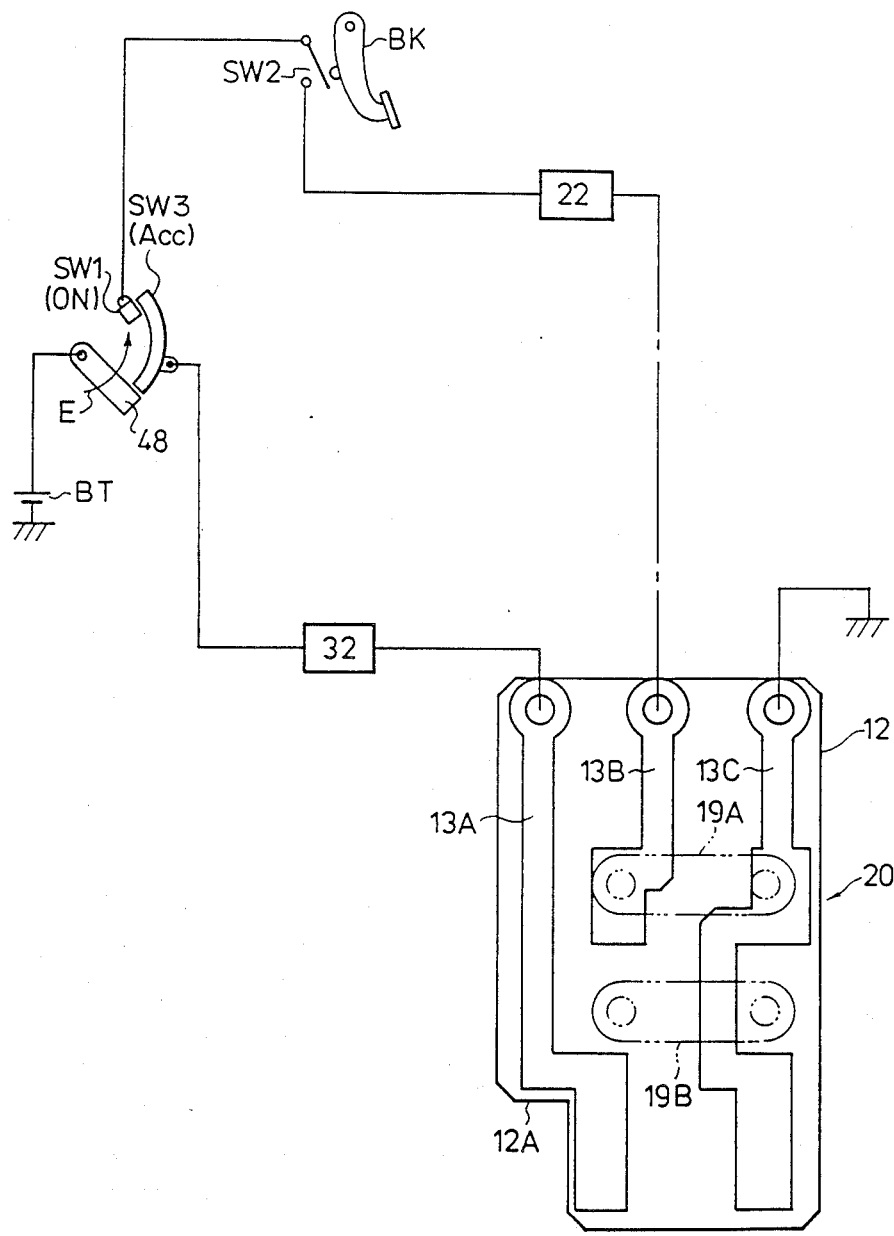
FIG. 6 is a front elevational view of a detection switch at the lock position.
Figure 7:
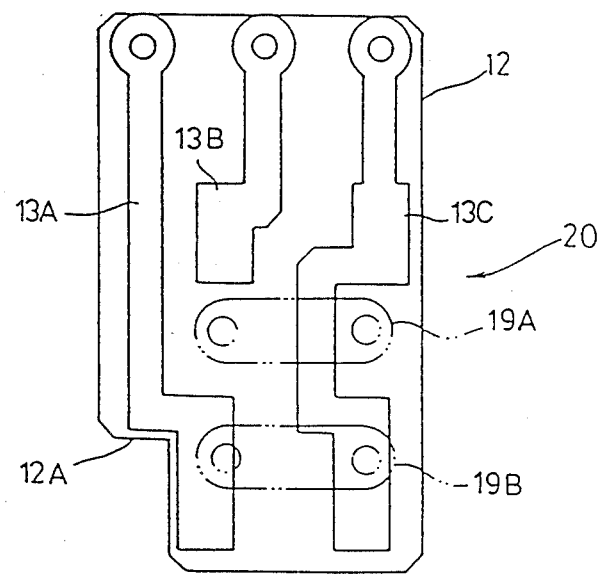
FIG. 7 is a front elevational view of the detection switch at the lock release position.

The structure is so arranged that when the movable body 16 is positioned at the upper locking position, either of the movable contact 19A is, as shown in FIG. 6, brought into contact with the fixed contacts 13B and 13C, while, when the movable body 16 is positioned at the lower lock release position, anther movable contact 19B is, as shown in FIG. 7, brought into contact with the fixed contacts 13A and 13C.

A support plate 21 is fastened and secured to the detent plate 4 in such a manner that the support plate 21 is positioned in front of the holder 9 shown in FIG. 1. A first solenoid 22 is secured to the support plate 21. An end of a link 23 is, with a pin 26, connected to an actuator 22A of this solenoid 22. A cylindrical portion 24 is secured to the intermediate portion of this link 23, and is fitted to the support plate 21 with a pin 25 in such a manner that this cylindrical portion 24 can be rotated. Another end of the link 23 is made pass through the opening 11 in the holder 9 and is arranged to be detachable with respect to the securing stepped portion 18 of the movable body 16. Therefore, this link 23 forms a main portion of a locking means for retaining the movable body 16 at the locking position. The link 23 is urged by a coil spring 27 wound to the cylindrical portion 24 in the direction at which the link 23 can be engaged with the movable body 16 (in a direction designated by an arrow B). When the first solenoid 22 is not actuated, the link 23 is urged to turn in the direction designated by the arrow B by the urging force of the coil spring 27, while, when the first solenoid 22 is actuated, the actuator 22A is attracted in the direction designated by an arrow C so that the link 23 is turned in the reverse direction to the arrow B against the urging force of the coil spring 27 so that the link 23 moves away from the movable body 160.

As shown in FIG. 6, an end of the first solenoid 22 is earthed to the fixed contact 13B, while another end of the same is earthed, via the brake switch SW2, "ON" switch SW1 to be operated when the engine is supplied with electricity and a car battery BT. A movable contact 48 of the "ON" switch SW1 is arranged to coat in synchronization with the operation of the ignition key. The brake switch SW2 is switched on when a brake pedal BK is footed. The fixed contact 13C is earthed. Therefore, the first solenoid 22 is, at the lock position shown, in FIG. 6, arranged to be operated when the ignition "ON" switch SW1 is switched on and the brake pedal BK is as well footed.

Figure 8:
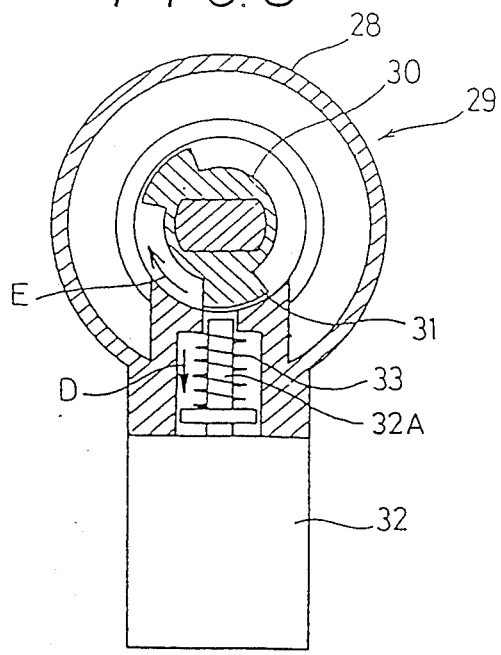
FIG. 8 is a cross-sectional view of a steering lock device under the lock condition.

On the other hand, as shown in FIG. 8, a rotor 30 is pivotted in a housing 28 of a steering lock device 29 so that this rotor 30 is arranged to be rotated together with a key rotor (omitted from illustration) to be rotated by an engine key (omitted from illustration). Projections 31 are projected from the outer surface of this rotor 30 so as to confront an actuator 32A Of a second solenoid 32 secured to the housing 28. The actuator 32A is urged in the direction (direction designated by an arrow D) in which the actuator 32A moves away from the projections 31. FIG. 8 illustrates a state in which the rotor 30 is positioned at the lock position and the steering device 29 is made lock state. In this state, the projection 31 confronts the actuator 32A of the second solenoid 32. When the rotor 30 is turned, in this state, by the key, in the direction designated by an arrow E and is then positioned at the position "ACC" shown in FIG. 9, the projection 31 is positioned at the position outside the actuator 32A. In this state, the ACC switch SW3 shown in FIG. 6 is switched on. Furthermore, when the rotor 30 is rotated in the direction designated by the arrow E by the key, the engine is brought to an operative state and the "ON" switch 1 is turned on.

On the other hand, the actuator 32A of the second solenoid 32 is, as shown in FIG. 8, urged by a compression coil spring 33 in the direction designated by the arrow D when the second solenoid 32 is turned off so that the actuator 32A is positioned outside the rotating range of the projection 31. On the other hand, when the actuator 32A is turned on, the actuator 32 A projects in the reverse direction to the arrow D against the compression coil spring 33 so that the actuator 32A is positioned within the rotating range of the projection 31 shown in FIG. 9.

As shown in FIG. 6, an end of the second solenoid 32 is connected to the fixed contact 13A of the detection switch 20, while another end of the same is earthed via the ACC switch SW3 and the car battery BT. Therefore, the structure is so constituted that when the ACC switch SW3 is switched on at the lock release position shown in FIG. 7, the second solenoid 32 is operated.

An operation of the above-described structure will be described hereinafter. When the shift lever 1 is positioned at the position "P", the rotor 30 is at the lock position, and the steering device 29 is made lock state, the detent pin 6 is, as shown in FIG. 4, engaged with the lock recessed portion 7 in the securing hole 5 in the detent plate 4, and the securing groove 17 of the movable body 16 is engaged with the detent pin 6. As a result, the movable body 16 is positioned at the upper lock position.

In this state, the ignition ACC circuit is in OFF state, both the switches SW1 and SW3 are in OFF state, and the first and second solenoids 22 and 32 are also in OFF state respectively. Since the first solenoid 22 is in OFF state, the link 23 is rotated in the direction designated by the arrow B so that a front end portion 23A of the link 23 is, as shown by a continuous line shown in FIG. 4, engaged with the securing stepped portion 18 of the movable body 16. As a result, the downward movement of the movable body 16 is prevented.

On the other hand, since the second solenoid 32 is in OFF state, the actuator 32A thereof is positioned at outside the rotation range of the projection 31 by the urging force of the compression coil spring 33 so that the rotation of the rotor 30 in the direction designated by the arrow E is allowed to be performed.

Therefore, in this state, the insertion and coming off of the key is allowed when the rotor 30 is positioned at the lock position, while the rotor 30 is allowed to be rotated between the lock position and the operation position.

When the rotor 30 is rotated in the direction designated by the arrow E and thereby positioned at the operation position in this state, the projection 31 moves to outside the position confronting the actuator 32A of the second solenoid 32 and the steering lock device 29 is brought into lock release state. In addition, the ACC switch SW3 is switched on, causing for the ACC circuit to be brought to operative state. Furthermore, the key is turned in the direction designated by the arrow E to be positioned at the "ON" position, causing for the engine to be started, and as well causing for the ON switch SW1 to be switched on. When the brake pedal BK is, in this state, footed, the switch SW 2 arranged to act in synchronization with the brake pedal BK is switched on. As a result, the first solenoid 22 is, via the fixed contacts 13B and 13C and the movable contact 19A (see FIG. 6) of the detection switch 20, connected to the car battery BT. Therefore, the first solenoid 22 is turned on. Therefore, the actuator 22A of the solenoid 22 is attracted in the direction designated by the arrow C. In accordance with this operation, the link 23 is rotated in the reverse direction to the arrow B so that the front end portion 23A is brought into state where the front end portion 23A is, as shown by an alternate long and two dashed line shown in FIG. 4, separated from the securing stepped portion 18 of the movable body 16.

Figure 5:
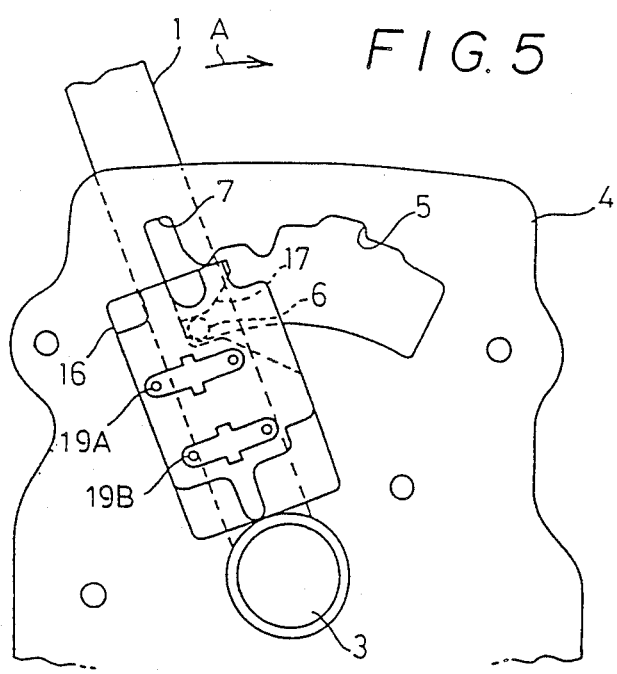
FIG. 5 is a side elevational view of the movable body and the detent plate at lock release position.

When the button 8 of the shift lever 1 is, in this state, pushed, the detent pint 6 and the movable body 16 which is engaged with the detent pin 6 are moved downward so that the movable body 16 is, as shown in FIG. 5, positioned at the lock release position. As a result, by operating the shift lever 1 in the direction designated by the arrow A, the detent pin 6 is separated from the securing groove 17. As a result, the shift lever 1 can be shifted from the position "P" to another position.

When the movable body 16 is positioned at the lock release position, the second solenoid 32 is turned on since the movable contact 19B of the detection switch 20 is, as shown in FIG. 7, brought into contact with the fixed contacts 13A and 13C. On the other hand, the first solenoid 22 is turned off since the movable contact 19A is moved away from the fixed contact 13B. When the second solenoid 32 is turned on, the actuator 32A thereof projects in the reverse direction to the arrow D against the compression spring 33 so that the same is positioned within the rotation range of the projection 31. As a result of the prevention of the rotation of the projection 31 in the reverse direction to the arrow E, the rotation of the rotor 30 to the lock position is also prevented. Therefore, it becomes impossible to make the steering lock device 29 lock state.

On the other hand, when the solenoid 22 is turned off, the link 23 is turned in the direction designated by the arrow B by the urging force of the twisted coil spring 27 so that the front end portion 23A thereof is brought into contact with the side surface of the movable body 16. Even if the brake pedal BK is footed in this state, the first solenoid 22 is remained its OFF state and the state of the link 23 cannot be changed.

Next, the case in which the shift lever 1 is shifted from the position other than the position "P" to the position "P" with pushing the button 8 retained will be described.

Since the movable body 16 is positioned at the lock release position at the position "P", the detent pin 6 is introduced into the securing groove 17 in the movable body 16 by the shifting operation of the shift lever 1. Since the movable body 16 is positioned at the lock release position when the shift lever 1 is positioned other than the position "P", the detent pin 6 can be immediately engaged with the movable body 16 when the shift lever 1 returns to the position "P". When the movement of the detent pin 6 is controlled by the direct engagement of the front end portion 23A of the link 23 with the detent pin within the lock recessed portion 7, the link front end portion 23A is introduced into the lock recessed portion 7 if the shift lever 1 is positioned other than the position "P". As a result, the movement of the detent pin 6, to the position "P" is prevented, causing an necessity of an operation to be performed that the solenoid 22 is moved before the movement of the shift lever 1 to the position "P" in order to separate the link front portion 23A from the lock recessed portion 7.

When the pressure applied to the button 8 is released after the shift lever 1 has been moved to the position "P", the detent pin 6 is moved upward together with the movable body 16 so as to be engaged with the lock recessed portion 7, and so as to make the movable body 16 locate at the lock position. As described above, the movable body 16 is positioned at the lock position, the front portion 23A of the link 23 urged in the direction designated by the arrow B is engaged with the securing stepped portion 18 in the movable body 16 so that downward movement of the movable body 16 is prevented (see FIG. 4). Furthermore, the movable contact 19B of the detection switch 20 is separated from the fixed contact 13A (see FIG. 6), causing for the second solenoid 32 to be turned off. As a result, the actuator 32A is moved to the direction designated by the arrow D and the same is positioned outside the rotation range of the projection 31. When this state is realized, since the rotation of the projection 31 in the reverse direction to the arrow E is allowed, the rotor 30 can be rotated to the locking position by the key in the reverse direction as designated by the arrow E. When the rotor 30 is rotated to the lock position, the projection 31 is, as shown in FIG. 8, brought into state where the same confronts the actuator 32A of the second solenoid 32. Furthermore, when the steering lock device 29 is brought into lock state, the insertion and separation of the key is simultaneously allowed. In addition, electricity supply to the engine is stopped, and the ACC circuit is brought into an OFF state. Therefore, even if the button 8 of the shift lever 1 is intended to be pushed in this state, downward movement of the movable body 16 is prevented by the link 23. Therefore, since the downward movement of the detent pin 6 is also prevented because of the above reason, the shift lever 1 cannot be shifted from the position "P" to another position.

According to the first embodiment, the detection switch 20 to be operated by the movement of the movable body 16 is provided, the movable body 16 being moved in synchronization with the movement of the detent pin 6 in such a manner that the movable body 16 is engaged with the detent pin 6 when the shift lever 1 is positioned at the position "P". Therefore, the fact that the detent pin 6 has been engaged with the lock recessed portion 7 of the detent plate 4 can be detected by the detection switch 20. As a result, the fact that the shift lever 1 has been positioned at a specific non-drive position "P" can be more assuredly detected than the device which detects the movement position of a shift lever.

Figure 10:
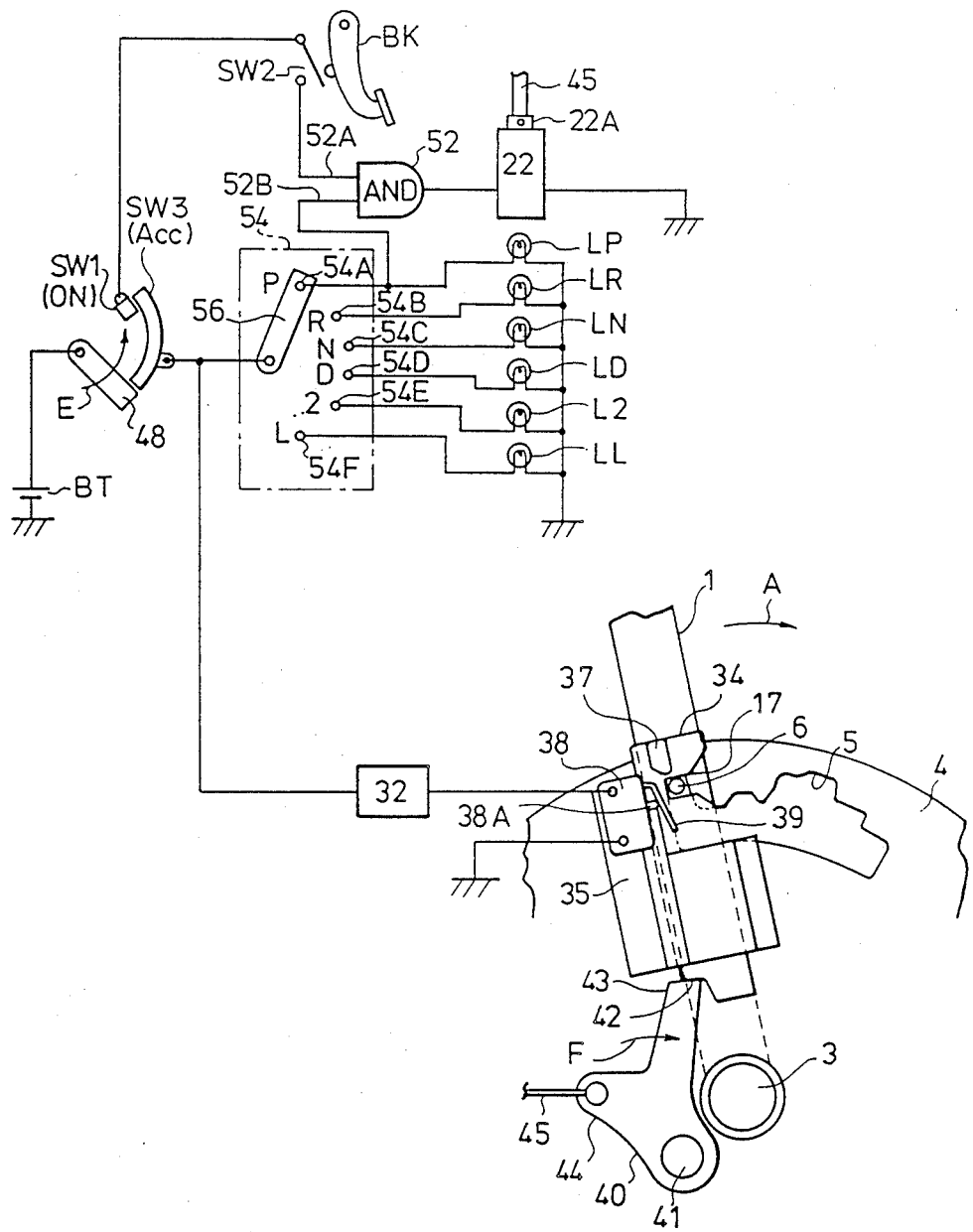
FIG. 10 is a side elevational view of an apparatus at a lock position according to a second embodiment in the present invention an corresponding to FIG. 4.
Figure 11:
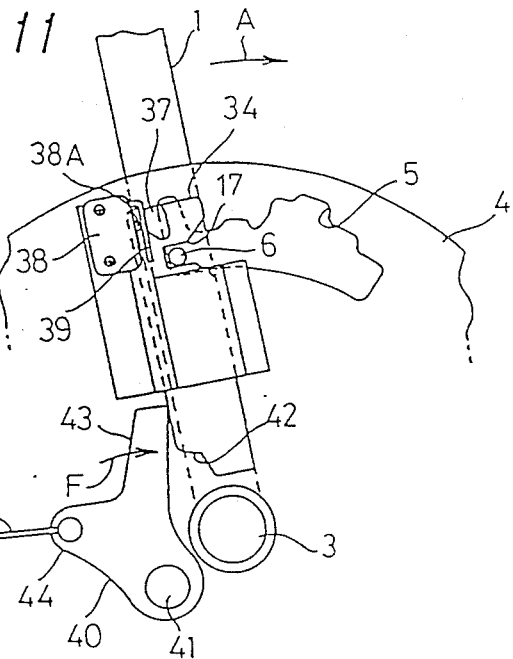
FIG. 11 is a side elevational view of the apparatus of the second embodiment at a lock released position moved from the position shown in FIG. 10.

FIGS. 10 and 11 illustrate a second embodiment of the present invention. The difference from the first embodiment lies in that: two side portions of a holder 35 are secured to the detent plate 4. A movable body 34 is disposed between this holder 35 and the detent plate 4 so as to be slid between the lock position (see FIG. 10) and the lock release position (FIG. 11). In the upper portion of the side surface (the surface in the opposing side to the detent plate 4) on this side of the movable body 34, a projection 37 is provided, as a result of which a partial thick portion is formed. A limit switch 38 is positioned corresponding to the projection 37, and is secured to the holder 35. An abutting arm 39 having an elasticity is provided at the position confronting an operating member 38A projecting from the limit switch 38. The detection switch 38 is connected to the first solenoid 32 according to the first embodiment on the steering lock device side via a lead wire (omitted from illustration).

A lock lever 40 is rotatably provided for the detent plate 4 with a pin 41. The lock lever 40 includes a securing arm portion 42 which is arranged to be engaged with and separated from the securing stepped portion 42 of the movable body 34. A connecting arm portion 44 projecting from this lock lever 40 is connected to the actuator 22A of the solenoid 22 with the wire 45, and the same is urged in the direction designated by an arrow F by a twisted coil spring (omitted from illustration) wound to the pin 41. As a result, the connecting arm portion 44 is arranged to be rotated in the reverse direction to the arrow F when the solenoid 22 is supplied with electricity.

In this embodiment, the neutral switch 54 is, as shown in FIG. 10, added to the operation circuit of the solenoid 22 so that the parking position of the shift lever is detected. That is, an end of the first solenoid 22 is earthed, while another end of the same is connected to an end of an AND device 52. A terminal 52A at the other end of this AND device 52 is earthed via the brake switch SW2, the "ON" switch SW1 to be operated when the engine is supplied with electricity, and the car battery BT. Another terminal 52B at the other end of the AND device 52 is connected to the P-contact 54A of the above-described neutral switch 54. It is so arranged that, when the shift lever 1 is operated from the position "P" to the position "L", the movable contact 56 is brought into contact with this neutral switch 54 in such a manner that the same is, corresponding to the operation of the shift lever 1, brought into contact with a contact 54A of the position "P", a contact 54B of the position "R", a contact 54C of the position "N", a contact 54D of the position "D", a contact 54E of the position "2", and a contact 54F of the position "L". The movable contact 56 is connected to the ACC switch SW3 of the ignition accessory circuit so that, when the engine key is operated, the same is arranged to be connected to the car battery BT. Therefore, the terminal 52B is arranged to be connected to the car battery only when the shift lever 1 is positioned at the parking position, that is, when the engine output is not transmitted to the wheels. The AND device 52 is further arranged in such a manner that electricity is supplied to the solenoid 22 when the brake pedal BK is footed, causing for the switch SW2 to be switched on, and the switch SW1 is turned on at which the engine is operated. In this state, a circuit for supplying electricity to the engine is omitted from illustration.

The neutral switch 54 is arranged to light the position indicator lamps "LP", "LR", "LN", "LD", "L2", and "LL" in accordance with the position of the operated shift lever 1.

In this embodiment, the movable body 34 is positioned in the lower lock release position when the shift lever 1 is positioned at the position other than the position "P" and the front end portion of the securing arm portion 43 of the lock lever 40 is positioned in contact with the left end portion of the movable body 34 (see FIG. 11). In this state, the detection switch 38 is turned on since the operation member 38A of the detection switch 38 is abutted by the projection 37 of the movable body 34 via the abutting member 39. As a result of this, the solenoid 32 on the steering lock device side is turned on, and the mode change of the steering lock device from lock release state to lock state is prevented. When the shift lever 1 is shifted to the position "P" with the pressure to the button 8 retained, the detent pin 6 is, as shown in FIG. 11, engaged with the securing groove 17 of the movable body 34. In this state, when the pressure applied to the button 8 is released, the detent pin 6 is, together with the movable body 34, moves upward, as a result of which, the same is, as shown in FIG. 10, engaged with the lock recessed portion 8. Furthermore, the movable body 34 is positioned at the lock position. As a result, since the pressure of the projection 37 of the movable body 34 to the abutting member 39 is released, the detection switch 38 is turned off. Therefore, the solenoid 32 on the steering lock device is turned off, and the steering lock device is allowed to be changed from lock release state to lock state. On the other hand, the downward movement of the movable body 34 is prevented by the engagement of the securing arm 43 of the lock lever 40 with the securing stepped portion 42 of the movable body 34. If the engine is operated (if the switch SW1 is switched on) and the brake pedal BT is footed in this state, the lock lever 40 is rotated in the reverse direction to the arrow F since the switch SW2 is switched on, as a result of which, the downward movement of the movable body 34 is allowed.

Also in the second embodiment, since the fact that the detent pin has been engaged with the lock recessed portion 7 in the state where the shift lever 1 is positioned at the position "P" can be detected by the detection switch 38, the fact that the shift lever 1 has been located at the position "P" can be assuredly detected.

As the detection switch, a general slide switch or contact switch can be used only satisfying the fact that the same is operated in accordance with the movement of the movable body.

A third embodiment of the present invention will be described with reference to FIGS. 12 to 16. This third embodiment is characterized in that in particular the switch portion disclosed in the first embodiment is changed for the purpose of making the manufacture of the device easy. That is, it is preferable in the first embodiment, the switching timing from the lock position shown in FIG. 6 to the lock release position shown in FIG. 7 is arranged in such a manner that the detent pin 6 is at the central portion in the direction of the depth of the lock recessed portion 7. However, assuming a case where this switching timing is slipped toward the groove bottom of the lock recessed portion 7, the movable body is enabled to be moved when the driver boards the vehicle and then foots, in the state shown in FIG. 6, the brake pedal BK, causing for the solenoid 22 to be turned on. However, if the movable body 16 is slightly moved downward, the state shown in FIG. 7 is realized in which the solenoid is turned off. Therefore, in this state, even if the front end portion 23A of the link 23 is pushed toward the movable body 16 by the urging force of the twisted coil spring 27, the movable body 16 needs to be sufficiently moved downward so as to prevent the front end portion 23A of the link 23 from being engaged with the securing stepped portion 18.

However, since the moving stroke of the movable body 16, that is, the vertical movement stroke of the detent pin 6 at the position "P", is short, the above-described desired operation can be achieved only by securing the manufacturing and mounting dimensional relationship between the fixed contacts and the movable contacts of the detection switch 20, and the manufacturing and mounting tolerance between the movable body 16 and the link 23.

On the contrary, when the switch timing of the detection switch 20 is slipped closer to the inlet portion (downward directions in FIGS. 6 and 7) of the securing groove 17, the state shown in FIG. 7 is changed to state shown in FIG. 6 since the engine key is rotated to the lock position after the driver has moved the shift lever to the position "P" for the purpose of stopping the vehicle to alight from the vehicle. However, the solenoid 32 is turned off before the movable body is assuredly moved to the lock position, causing for the ignition key to be enabled to be rotated to the lock position. Therefore, the movable body 16 and the detent pin 6 is retained at the lock release positions.

As described above, the switching timing of the detection switch 20 needs to be performed correctly at the intermediate position of the short vertical stroke of the detent pin 6. The third embodiment to be described hereinafter is capable of overcoming this factor.

Figure 13:
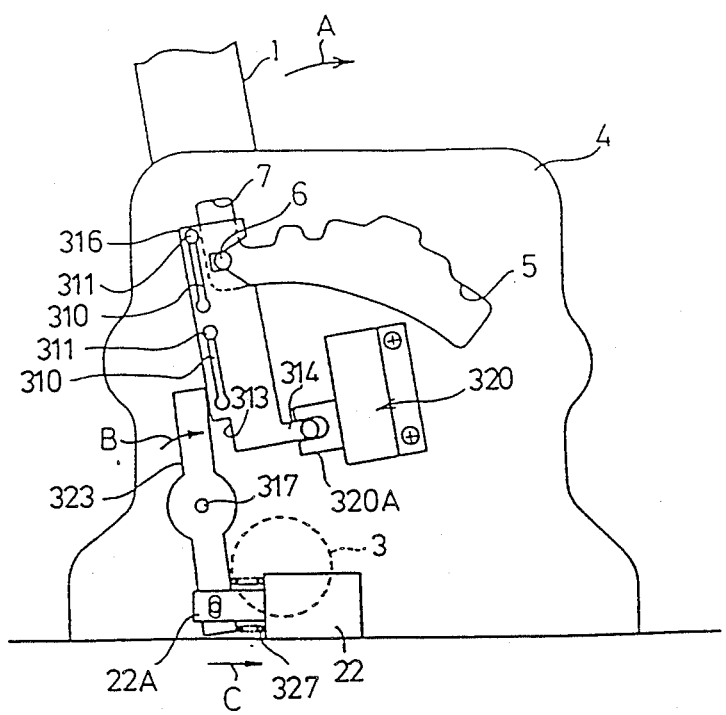
FIG. 13 is a side elevational view of the apparatus at a lock release position according to the third embodiment.
Figure 12:
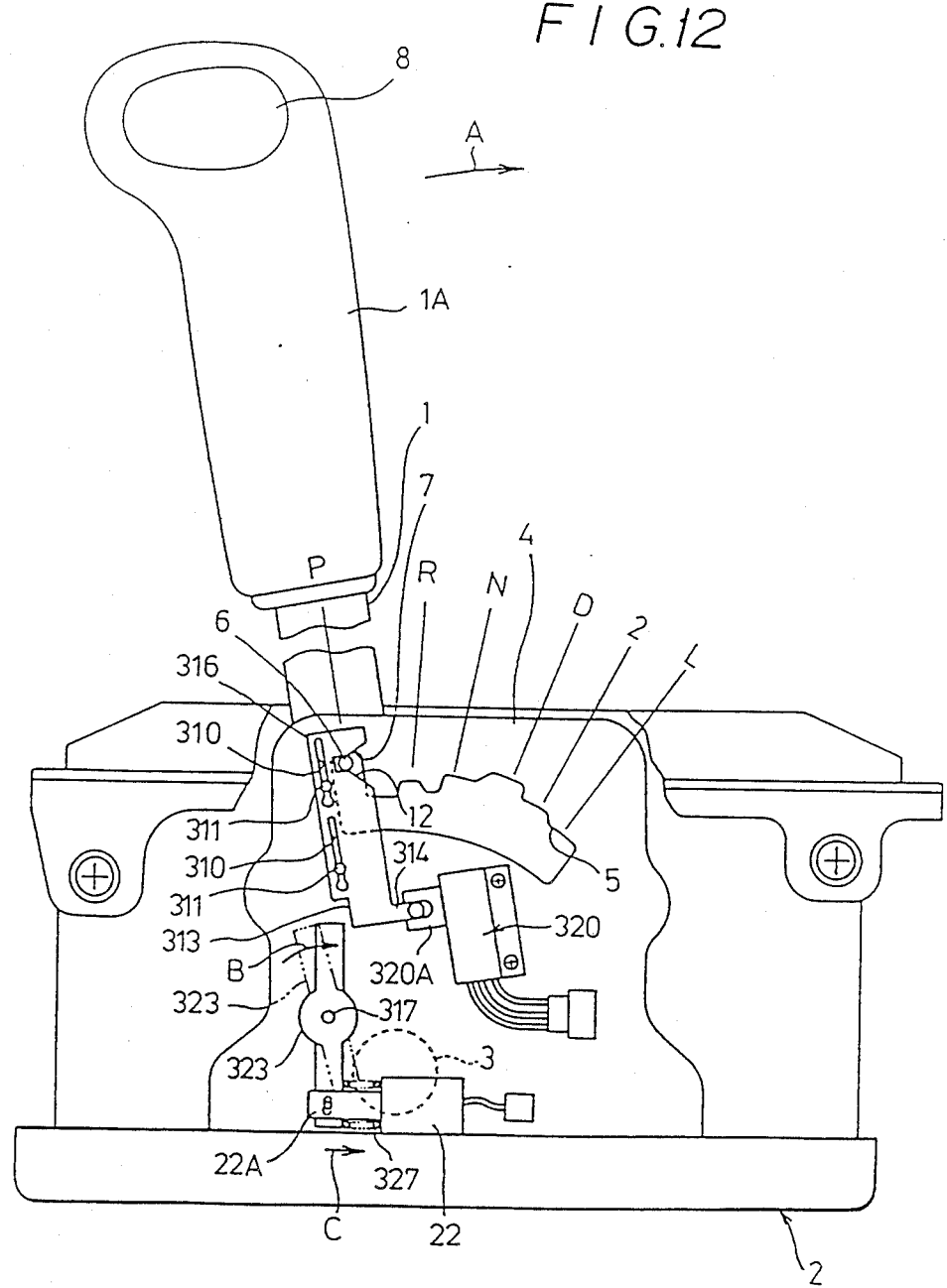
FIG. 12 is a side elevational view of an apparatus of a third embodiment in the present invention and corresponding to FIG. 2.

As shown in FIGS. 12 and 13, a movable body 316 according to this embodiment is slidably guided in the direction similar to the first embodiment by way of a pin 311 projected from the detent plate 4 is inserted into a pair of elongated holes 310 formed in the lengthwise direction.

On one side in the lower portion a movable body 316 is formed a cut 313 which is arranged to correspond to a locking link 323. The locking link 323 is pivotted by the detent plate 4 at the central portion thereof by a pin 25. An end of the locking link 323 is connected to the actuator 22A of the first solenoid 22, while another end of the same is urged in the direction in which the same is engaged with the cut 313 in the movable body 316 by a compression spring 327.

The locking link 323 and the movable body 316 are preferable to be made in such a manner that either one of them is made of a synthetic resin while another one is made of a metal considering the abrasion at the time of contact.

An arm 314 projects over the another end portion in the lower position of the movable body 316 so as to be engaged with a slider 320A of a slide switch 320. As a result, the movement of the movable body can be transmitted to the slider.

Figure 14:
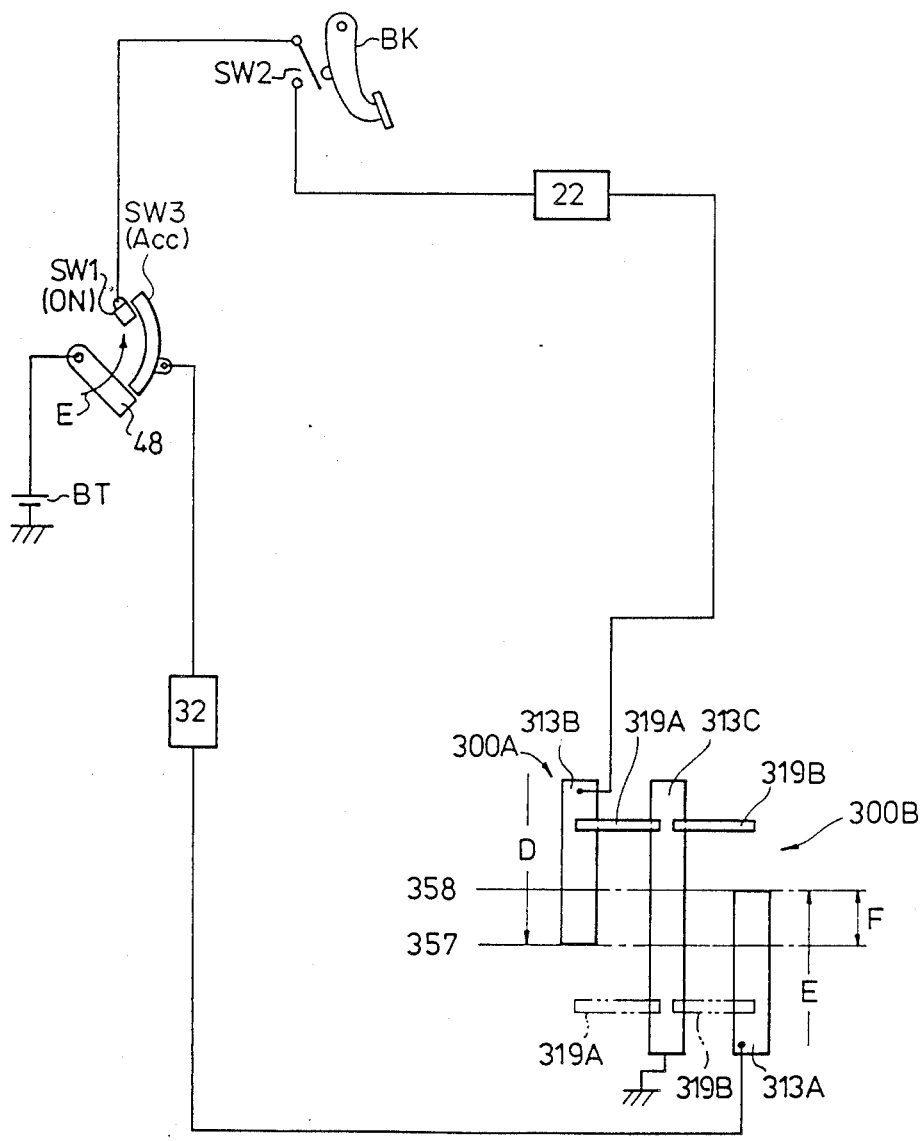
FIG. 14 is a front elevational view of a detection switch according to the third embodiment.
Figure 15:
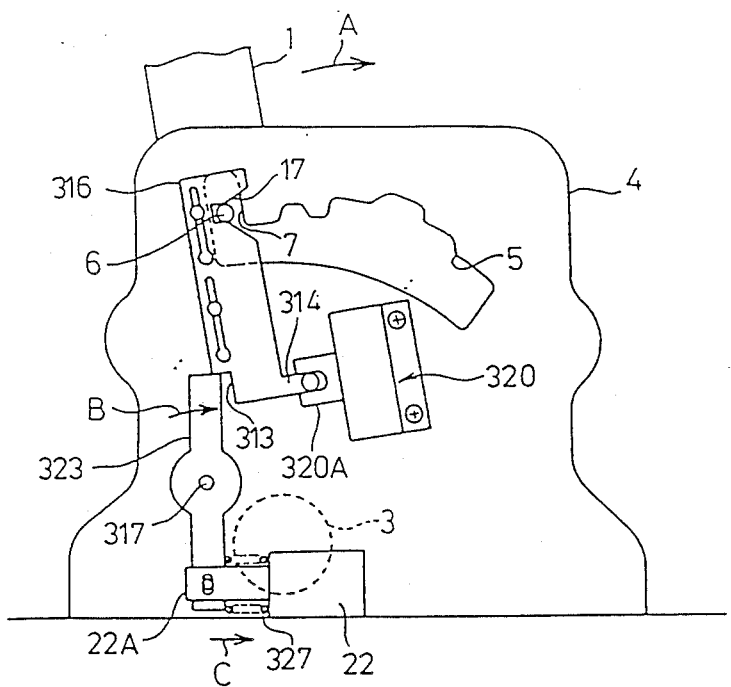
FIG. 15 is a side elevational view the apparatus of a lock position according to the third embodiment.
Figure 16:
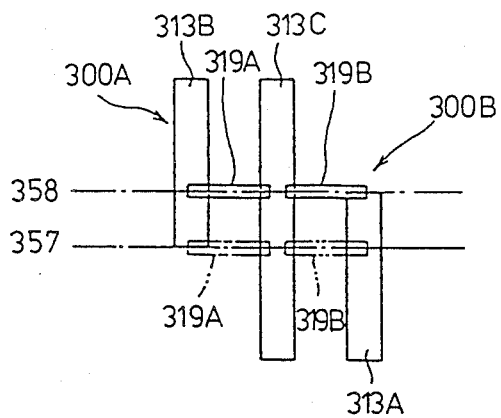
FIG. 16 is a schematic explanatory view illustrating an operation of the detection switch shown in FIG. 14.

The structure of the slide switch 320 is, as shown in FIG. 14, arranged in such a manner that a first fixed contact 313A and a second fixed contact 313B are in parallel to each other and set off each other in the lengthwise direction on the two sides of a common fixed contact 313C. A first movable contact 319A and a second movable contact 319B connected to the slider 320A shown in FIG. 12 respectively connect between the common fixed contact 313C and the second fixed contact 313B, and between the common fixed contact 313C and the first fixed contact 313A. These common fixed contact 313C and the first and second fixed contacts, 313A, and 313B are arranged to be the wiring structure in accordance with the three fixed contacts 13C, 13A, and 13B described in the first embodiment (see FIG. 6).

When the movable body 316 is at the lock position, the first and second movable contacts 319A and 319B are brought to state shown by a continuous line in FIG. 14. As a result, the first movable contact 319A turns on the fixed contact 313C and the second movable contact 313B, while when the movable body 31B is brought to the lock release position, the same becomes state designated by an imaginary line shown in FIG. 14. Therefore, the second movable contact 319B turns on the common and first fixed contacts 313C and 313A.

As shown in FIGS. 12 and 13, the movable body 316 according to the present invention is made movable along the line connecting the shaft 3 and the lock recessed portion 7 by inserting the pin 311 provided for the detent plate 4 into the guide groove 310 which is formed vertically in the left portion of the movable body 316. The movable body 316 is provided with a cut portion 313 in the left lower portion thereof and is provided with a projection 314 projecting to the right in the lower portion thereof.

A first switch portion 300A for controlling the first solenoid 22 is formed by the common fixed contact 313C, the first fixed contact 313A and the first movable contact 319A which is arranged to be contact and separated from the former two contacts. Furthermore, a second switch portion 300B for controlling the second solenoid 32 is formed by the common fixed contact 313C, second fixed contact 313A and the second movable contact 319B which is arranged to be contact and separated from the former contacts. The first switch portion 300A has a switching point 357 thereof that is positioned (see FIG. 15) lower than the position where the cut portion 313 of the movable body 316 which had been positioned at the lock position and then has been moved downward together with the detent pin 6 is brought into contact with the front end of the link 323. That is, the first switch portion 300A has a switching point 357 at the position where the movable body 316 is free from the restriction of the link 323. The first switch portion 300A is arranged to be switched on when the first movable contact 319A is positioned in a region D which is upper than the switching point 357. The first switch portion 300A is also arranged to be switched off when the first movable contact 319A is positioned lower than the region D. The second switch portion 300B has a switching point 358 thereof at the position upper than the position where the cut portion 313 of the movable body 316 is brought into contact with the front end of the link 323, that is, the second switch portion 300B has the switching point thereof at the position where the detent pin 6 can be assuredly engaged with the lock recessed portion 7 and thereby the movable body 316 can be restricted by the link 323. The second switch portion 300A is arranged to be actuated at the position at which the second movable contact 319B is position in a region E which is lower than this switching point 385, while the same is arranged to be switched off when the second movable contact 319B is positioned upper than the switching point 358. Therefore, the switching point 357 of the first switch portion 300A and the switching point 358 of the second switch portion 300B are positioned in a vertically set off manner. The region D in which the first switch portion 300A can be actuated and the region E in which the second switch portion 300B can be actuated are overlapped in the region F disposed between the two switching points 357 and 358.

An operation of the third embodiment will be described. When the shift lever 1 is, as shown in FIG. 12, positioned at the position "P" and the rotor 31 (see FIG. 8) of the steering lock device is furthermore positioned at the lock position, the detent pin 6 is engaged with the lock recessed portion 7 formed in the securing hole 5 in the detent plate 4, and the movable body 316 is thereby positioned at the upper lock position.

In this state, since the ignition ACC circuit is in turned-off state, both the switches SW1 and SW3 are switched off, and the first and second solenoids 22 and 32 are also turned off. Since the first solenoid 22 is turned off in this state, the link 323 is rotated in the direction designated by the arrow B so that the front end of the link 323 is, as shown by the continuous line in FIG. 12, introduced into the cut portion 313 of the movable body 316.

Furthermore, since the second solenoid 32 is turned off, the actuator 32A of this second solenoid 32 is, as shown in FIG. 8, positioned outside the rotating range of the projection 31 by the urging force from the compression coil spring 33 so that the rotation of the rotor 30 in the direction designated by the arrow E is allowed to be performed.

When the rotor 30 is, in this state, rotated in the direction designated by the arrow E as shown in FIG. 8, and is positioned at the operation position, the projection 31 is moved outside the position confronting the actuator 32A of the second solenoid 32, and furthermore the steering lock device 29 is brought to lock release state. In addition, the switch SW1 is switched on, causing for the ACC circuit to be actuated, and the engine is started.

Therefore, even if the button 8 of the shift lever 1 is pushed in this state, the downward movement of the movable body 316 is restricted by the link 323. As a result, the shift lever 1 locked at the position "P". On the other hand, the insertion and drawing of the key is allowed to be performed with the rotor 30 positioned at this lock position. In addition, the rotation of the rotor 30 is allowed to be performed between the lock position and the operation position.

When the rotor 30 is rotated in the direction designated by the arrow E shown in FIG. 8 by the key in this state, the projection 31 is brought outside the position confronting the actuator 32A of the second solenoid 32, and the steering lock device 29 is brought into lock release state. Furthermore, the switch SW3 is turned on, and the ACC circuit becomes operative state. In addition, the key is rotated, causing for the ignition switch to become "ON", the engine is started, and the switch SW1 is turned on. When the brake pedal BK is footed in this state, a switch SW2 arranged to be synchronized with the brake pedal BK is switched on so that the first solenoid 22 is turned on via the first switch portion 300A. As a result, the actuator 22A of the first solenoid 22 is attracted in the direction designated by the arrow C. In synchronization with this, the link 323 is rotated in the reverse direction to the arrow B so that the front end thereof is, as designated by an alternated long and two short dashes line shown in FIG. 12, brought to state where the same is retracted from the cut portion 313 of the movable body 316.

When the button 8 of the shift lever 1 is pushed in this state, the detent pin 6 is moved downward together with the movable body 316 which is engaged with the detent pin 6. As a result, the movable body 316 is positioned at the lock release position shown in FIG. 13. When the shift lever 1 operated in the direction designated by the arrow A, the shift lever 1 can be shifted from the position "P" to another position.

Figure 9:
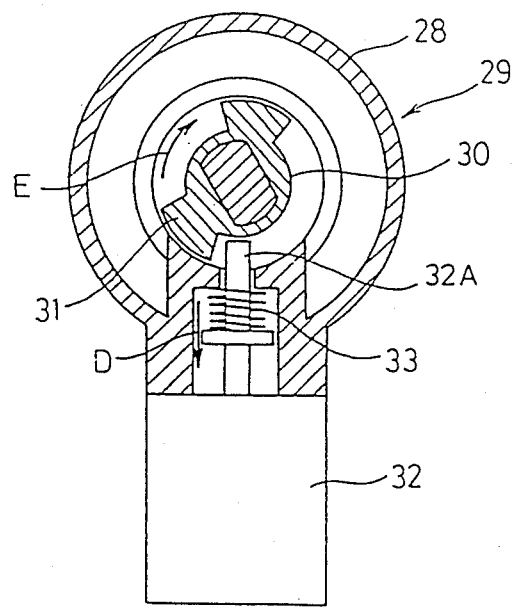
FIG. 9 is a cross sectional view of the steering lock device under an ACC condition.

The slider 320A of the switch 320 is moved downward in synchronization with the downward movement of the movable body 316. And also in synchronization with this movement, the first and second movable contacts 319A and 319B are moved lower from the position designated by the continuous line shown in FIG. 14. When the second movable contact 319B reaches the switching point 358 as shown by the continuous line in FIG. 16, the second switch portion 300B is switched from non-actuated state to operation state. As a result, the second solenoid 32 on the steering lock device 29 side shown in FIG. 9 is turned on, causing for the actuator 32A of the second solenoid 32 to project in the reverse direction to the arrow D and causing for the same to be positioned within the rotating range of the projection 31. When this state is realized, the rotation of the projection 31 in the reverse direction to the arrow E is prevented by the actuator 33A. As a result, the rotation of the rotor 30 to the lock position is prevented, causing for the steering lock device 29 to be impossible to be brought to lock state. Furthermore, the movable body 316 is moved downward and the first movable contact 391A is thereby made reach the switching point 357 designated by an alternate long and two short dashes line in FIG. 16. When the first movable contact 319A exceeds the position of the switching point 357, the first solenoid 22 is turned off. As a result, the link 323 is rotated in the direction designated by the arrow B by the urging force from the compression coil spring 327 regardless of the state of the brake pedal, and the front end of the link 323 is brought into contact with the left end in the upper portion of the cut portion 313. Therefore, the state of 323 is maintained even if the movable contact 316 is moved to the lock release position (see FIG. 13).

On the other hand, when the shift lever 1 is shifted from the position other than the position "P" with the button 8 pushed, the detent pin 6 is engaged with the securing groove 17 in the movable body 316 which has been positioned at the lock release position. When the pressure which has been applied to the button 8 is released, the detent pin 6 is moved upward together with the movable body 316 so that the same is engaged with the lock recessed portion 7 and the movable body 316 is positioned at the lock position.

When the first movable contact 319A reaches the switching point 357 in synchronization with the upward movement of the movable body 316, the first switch portion 300A is switched to operation state. In this state, if the brake pedal BK is footed, the link 323 is rotated in the reverse direction to the arrow B, while if the brake pedal is not footed, the link 323 is retained as it has been rotated in the direction designated by the arrow B. When the movable body 316 is further moved upward, the front end of the link 323 is introduced into the cut portion 313. When the movable body 316 is furthermore moved upward, causing the second movable contact 319B to exceed the switching point 358, the second switch portion 300B is switched to non-operation state. As a result, the second solenoid 32 is turned off, and the actuator 32A thereof is moved in the direction designated by the arrow D and is positioned outside the rotating range of the projection 31. When this state is realized, the rotation of the projection 31 in the reverse direction to the arrow E is allowed to be performed, the rotor 30 can be, by the key, rotated in the reverse direction designated by the arrow E so as to make the same position at the lock position.

When the rotor 30 is rotated to the lock position, the projection 31 is brought to the state shown in FIG. 8 wherein the same confronts the actuator 32 of the second solenoid 32. Furthermore, the steering lock device 29 is brought to lock state and the insertion and drawing of the key is allowed to be performed. In addition, the ACC circuit is turned off, and both the switches SW1 and SW3 are switched off. Therefore, in this state, if the button 8 of the shift lever 1 is pushed, the detent pin 6 cannot be released from the lock recessed portion 7 since the downward movement of the movable body 316 is restricted by the link 323. Therefore, the shift lever 1 cannot be shifted from the position "P" to another position.

According to this embodiment, the switching point 357, of the first switch portion 300A for controlling the first solenoid 22 and the switching point 358 of the second switch portion 300B for controlling the second solenoid 32 are, as described above, disposed in an offset manner to each other. Furthermore, the region D at which the first switch portion 300A is actuated and the region E at which the second switch portion 300B is actuated are overlapped at the position between the two switching points 357 and 358. As a result of the thus-arranged structure, even if a mounting error occurs for the first and second switch portions 300A and 300B, such error can be absorbed. Therefore, control of the first and second solenoids 22 and 32 can be made free from a problem. Therefore, the mounting of these first and second switch portions 300A and 300B can be easily conducted.

Figure 17:
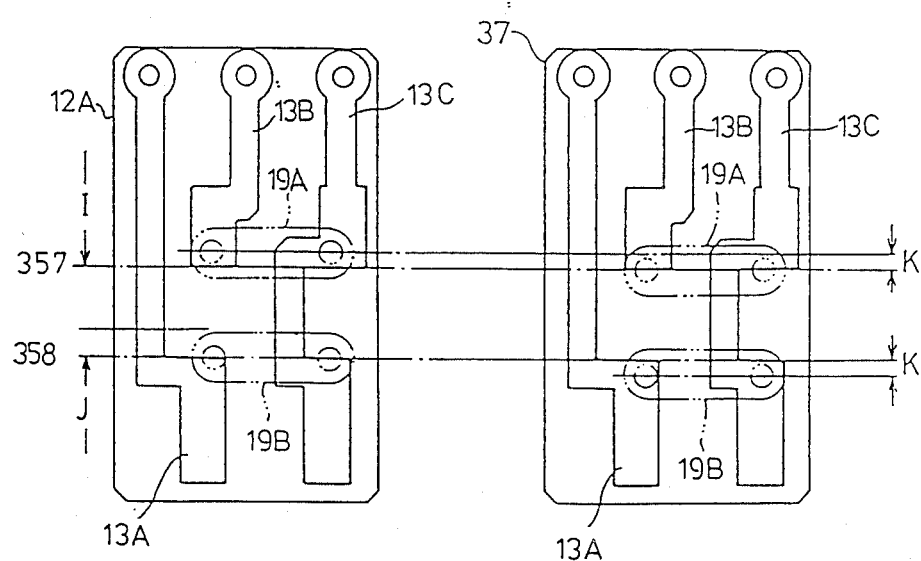
FIGS. 17A and 17B are front elevational view of a detection switch according to a fourth embodiment in the present invention.

FIG. 17 illustrates a device according to a fourth embodiment of the present invention and which corresponds to the state shown in FIGS. 6 and 7. FIG. 17 clearly illustrates the state where a region I in which the movable contact 19A turns on the fixed contacts 13B and 13C and a region J in which the movable contact 19B turns on the fixed contacts 13A and 13C are overlapped over a length K. From which, the similar effect obtained by the third embodiment can be obtained.

Figure 18:
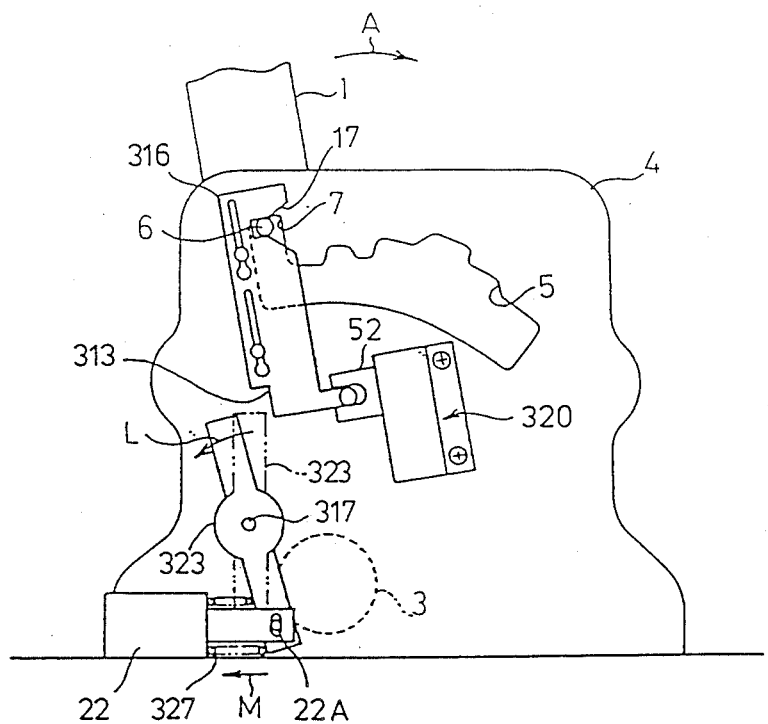
FIG. 18 is a side elevational view of an apparatus of a fifth embodiment in the present invention and corresponding to FIG. 12.
Figure 19:
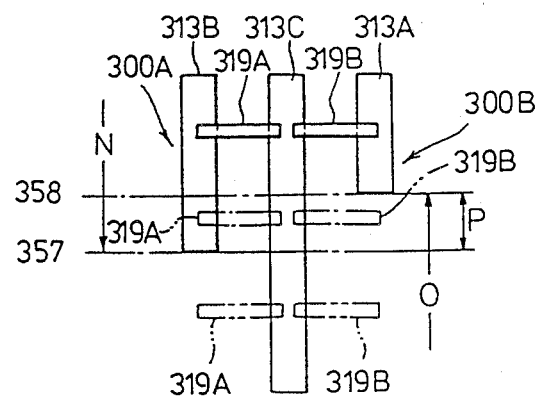
FIG. 19 is a front elevational view of a detection switch of the fifth embodiment in the present invention.

FIGS. 18 and 19 illustrate a fifth embodiment of the present invention. Only the portion different from the third embodiment will be described. The actuator 22A of the first solenoid 22 faces to the right in FIG. 18. The lower end portion of the link 323 which serves as a lock lever is rotatably connected to the actuator 22A. The link 323 is urged in the direction designated by an arrow L by the compression coil spring 327 as shown in FIG. 18 when the first solenoid 22 is turned off. As a result, the front end of this link 323 is positioned outside the cut portion 323 of the movable body 316. When the first solenoid 22 is turned on, the actuator 22A is attracted in the direction designated by an arrow M. As a result, the link 323 is rotated in the reverse direction designated by the arrow L as designated by an alternate long and two short dashes line so that the front end thereof is introduced into the cut portion 313 of the movable body 316.

Referring to FIG. 19 illustrating the structure of the contacts of the switch 320 which is arranged to be in synchronization with the movable body 316, the first fixed contact 313A is, different from the third embodiment (see FIG. 14), disposed on one side in the lengthwise direction and on the same side as the second fixed contact 313B. The length of the first fixed contact 313A is made shorter than that of the second fixed contact 313B (region N) by length P, and its operation range is arranged to be length O.

An operation of this fifth embodiment will now be described. In state where the shift lever 1 is positioned at the position "P" and the movable body 316 is positioned at the upper lock position, the first and second movable contacts 319A and 319B are positioned as designated by a continuous line shown in FIG. 19. The rotor 30 is rotated to the ACC position in this state, and when the same then reaches the "ON" position, both the switches SW1 and SW3 are brought to "ON" state. Furthermore, since the first and second switch portions 300A and 300B are turned on, a driving current passes through the first solenoid 22 so that the first solenoid 22 is turned on. As a result, the actuator 22a is attracted in the direction designated by the arrow M, causing the link 323 to be rotated in the reverse direction to the arrow L. When a predetermined time period is elapsed after the first solenoid 22 has been turned on, the current is changed to a retaining current by a timer (omitted from illustration). As a result, the link 323 is retained at the position after it has been rotated in the direction designated by the arrow L. When the brake pedal is footed in this state, the first solenoid 22 is turned off, and the link 323 is rotated in the direction designated by the arrow L by the compression coil spring 327. Since the downward movement of the movable body 316 is allowed to be performed in this state, the shift lever 1 can be released from lock state by operating the button 8 of the shift lever 1. However, if the button is pushed without footing the brake pedal, the movable body 316 can be moved downward only by the contact of the front end thereof with the link 323. In this state, even if the second switch portion 300B is turned off as shown by an alternate long and a dash line, the turning-on state of the first switch portion 300A is retained. Therefore the turning-on state of the first solenoid is retained so that the shift lever 1 cannot be released from the lock state.

On the other hand, when the shift lever 1 is shifted from the position other than the position "P" to the position "P", the movable body 316 is moved upward in synchronization with the release of the pressure which has been applied to the button 8. As a result, the second movable contact 319B is moved upward from the position designated by the alternate long and two short dashes line shown in FIG. 19 to reach the switching point 357, causing for the first switch portion 300A to be switched on. On the other hand, since the second switch portion 300B is retained its turned-off state, the first solenoid 22 is also retained to be turned off. When the movable body 16 is further moved upward, causing for the second switch portion 300B to be switched on, and the first solenoid 22 is turned on. As a result, the link 323 is rotated in the reverse direction to the arrow L, and the front end of this link 323 is introduced into the cut portion 313 of the movable body 316. When the brake pedal is footed at the time when the second switch portion 300B is positioned to be turned on in this state, the turned-off state of the first solenoid 22 is retained, while the same is turned on when the footing of the brake pedal is released.

In this state, the second solenoid 32 on the steering lock device 29 side is turned off when the second movable contact 32 of the second switch portion 300B is positioned upper than the switching point 358. As a result, the steering lock device 29 is allowed to be locked. On the other hand, when the second movable contact 319B is positioned lower than the switching point 358, the second solenoid 32 is turned on. As a result, the steering lock device 29 is prevented from being brought to lock state.

Also in the fifth embodiment, the switching point 357 of the first switch portion 300A and the switching point 358 of the second switch portion 300B are disposed in a vertical offset manner, and the region N in which the first switch portion 300A is actuated and the region O in which the second switch portion 300B is actuated are overlapped in the region P. As a result of such structure, a mounting error for the first and second switch portions 300A and 300B can be absorbed. Therefore, the control of the first solenoid 22 can be made free from a problem, and mounting of the switch can be easily conducted.

Furthermore; in this case, when the movable body 316 is moved upward from the lock release position to the lock position, the first solenoid 22 is arranged to be turned on at the switching point 358 of the second switch portion 300B as an alternative to the switching point 357 of the first switch portion 300A. Therefore, when the first solenoid 22 is turned on, the link 323 can be assuredly introduced into the cut portion 313 of the movable body 316, causing for the movable body 316 to be assuredly held. If the first solenoid 22 is arranged to be turned on at the switching point 357 of the first switch portion 300A, the front end of the link 323 is brought into contact with the top edge of the cut portion 313 in the movable body, causing for a fear that the current is switched to the retaining current. It leads to a fact that the link 323 cannot be rotated in the reverse direction to the arrow L even if the movable body 316 is then moved further upward. Therefore, there arises a fear that the restriction of the movable body 316 by the link 323 becomes impossible. However, such fear can be clearly overcome according to the fifth embodiment.

Although in each of the embodiments, the movable body may be directly restricted by the first solenoid as an alternative to the manner that the link is used. Furthermore, a motor or the like can be used as an alternative to the solenoid.

What is claimed is:

1. A transmission operating apparatus for automatic transmissions comprising:
   (a) a shift lever to be moved in a shifting direction by a driver when gear shift is intended;
   (b) a detent pin secured to said shift lever substantially perpendicularly to the shifting direction of the same and being able to be moved from a first position to a second position by an operation of a pushbutton performed by the driver;
   (c) detent means for preventing movement of said shift lever to another shift position by being engaged with said detent pin when said detent pin is positioned at said first position and at a specific shift position of said shift lever, while said detent means permitting a possibility for said shift lever to move to another shift position when said detent pin is positioned at said second position;

(d) a movable body which moves between said first position and said second position together with said detent pin in such a manner that the same is engaged with this detent pin when said shift lever is positioned at said specific position, this movable body being retained at said second position when said shift lever has been moved from said specific position to another shift position, while the same is engaged with said detent pin when said shift lever returns to said specific position;

(e) detection means for detecting whether said detent pin is positioned at said first position or said second position by detecting the movement of said movable body; and (f) lock means for, when said movable body is positioned at said first position together with said detent pin, preventing movement of said movable body and detent pin to said second position by being engaged with said movable body, this lock means needs to be released by the driver to conduct a shifting operation of said shift lever to the position other than said specific position.

2. A transmission operating apparatus for automatic transmissions according to claim 1, wherein said movable body is provided with a securing groove to accommodate said detent pin of said shift lever, this securing groove preventing a relative movement of said detent pin and said movable body in the moving direction between said first position and said second position by accommodating said detent pin when said shift lever returns to said specific shift position.

3. A transmission operating apparatus for automatic transmissions according to claim 2, wherein an inlet portion of said securing groove is arranged to be a gradually widened guide surface for the purpose of making accommodation of said detent pin into said securing groove when said shift lever is moved from said shift position to said specific position.

4. A transmission operating apparatus for automatic transmissions according to claim 1, wherein said detent means is provided with a detent plate having a lock recessed portion into which said detent pin is engaged with, said movable body is arranged to be moved along said lock recessed portion of said detent plate, and said securing groove is arranged along said lock recessed portion.

5. A transmission operating apparatus for automatic transmissions according to claim 4, wherein a holder for accommodating said movable body is secured to said detent plate, and said movable body is moved by the guide of this holder.

6. A transmission operating apparatus for automatic transmissions according to claim 5, wherein said holder is provided with an opening through which said lock means passes, and engagement of said lock means with said movable body is realized through said opening.

7. A transmission operating apparatus for automatic transmission according to claim 1, wherein said lock means is moved perpendicular to the moving direction of said movable body between said first and second positions so as to be engaged with said movable body.

8. A transmission operating apparatus for automatic transmissions according to claim 7, wherein said lock means is urged in the direction in which the same is engaged with said movable body, while said lock means is moved in the direction in which the same is separated from said movable body by an operation of the driver.

9. A transmission operating apparatus for automatic transmissions according to claim 8 further comprising a solenoid for separating said lock means from said movable body, this solenoid being operated by braking operation or the like performed by the driver.

10. A transmission operating apparatus for automatic transmissions according to claim 1, wherein said detection means is provided with fixed contacts and movable contacts, said movable contacts being secured to said movable body.

11. A transmission operating apparatus for automatic transmissions according to claim 10, wherein said movable contact moves to contact or separates from a first fixed contact at said first position so that a first circuit is actuated, while the same moves to contact or separates from a second fixed contact at said second position so that a second circuit is actuated, as a result of which, a first and second position of said detent pin is each detected.

12. A transmission operating apparatus for automatic transmissions according to claim 11, wherein said fixed contact is provided for a holder for guiding said movable body.

13. A transmission operating apparatus for automatic transmissions according to claim 12, wherein said movable contact can realize a state where both said first circuit and second circuit are actuated between said first position and said second position.

14. A transmission operating apparatus for automatic transmissions according to claim 11, wherein a pair of said first fixed contacts are, in parallel to each other, provided along the direction in which said detent pin moves within a specific shift position, whereby said first circuit is actuated by making said first movable contact connect between said two fixed contacts, and a pair of said second fixed contacts are similarly provided, whereby said second circuit is actuated by making said second movable contact connect between said two fixed contacts.

15. A transmission operating apparatus for automatic transmissions according to claim 14, wherein said first movable contacts and said first fixed contacts enable said movable body to move to said second position when an ignition key is at a turned-on position, a brake pedal is depressed, and said detent pin is positioned at said first position.

16. A transmission operating apparatus for automatic transmissions according to claim 14, wherein said second fixed contacts and said second movable contacts actuate a solenoid for the purpose of realizing movement of said ignition key from said ACC position to a lock position when said ignition key is at said ACC position and said detent pin is at said second position.

17. A transmission operating apparatus for an automatic transmission for vehicles comprising:

(a) a shift lever for switching a hydraulic pressure circuit for an automatic transmission;

(b) a detent pin arranged to be able to move in the axial direction of said shift lever between a first position and a second position, and being driven to said second position by an operation of the pushbutton of said shift lever;

(c) a detent plate which prevents the movement of said shift lever when said detent pin is positioned at said first position in a case where said shift lever has been moved to a parking position, and which permits for the shift lever to be able to move when said detent pin is positioned at said second position;

(d) a movable body disposed corresponding to said parking position of said shift lever, is arranged to be positioned at said second position when said shift lever is positioned at a shift position other hand said parking position, is engaged with said detent pin by a shifting operation of said shift lever to said parking position, and is thereby moved to said first position with said detent pin;

(e) lock means for preventing movement of said movable body to said second position by being engaged with said movable body which has been positioned at said first position;

(f) detection means for detecting said first position and said second position for said movable body in corresponding to said movable body; and (g) lock release means for releasing said lock means by a special operation performed by a driver such as depression of said brake pedal, and in response to a signal from said detection means, and when said movable body is positioned at said first position so that said movable body can be moved to said second position.

18. A transmission operating apparatus for an automatic transmission for vehicles according to claim 17, wherein said movable body is formed a securing groove for accommodating said detent pin of said shift lever.

19. A transmission operating apparatus for an automatic transmission for vehicles according to claim 18, wherein said detection means is provided with fixed contacts and movable contact and said movable contacts are secured to said movable body:

20. A transmission operating apparatus for automatic transmission comprising: a shift lever for selecting one of a plurality of positions by a moving operation; a detent pin which is moved in a direction by a pushing operation of a button provided for said shift lever, while the same is moved to another direction by release of the pushing of said button; a detent plate having a lock recessed position for limiting the moving operation of said shift lever in association with said detent pin and to which said detent pin is engaged with after said detent pin has been moved to another direction when said shift lever is shifted to a specific non-operation position; a movable body which is engaged with said detent pin when said shift lever is shifted to said non-operation position so as to be moved between a lock position and a lock release position in synchronization with said detent pin; a first and a second switch portion each of which is arranged to be operated in synchronization with the movement of said movable body and whose state is changed between an operation state and a non-operation state with respect to each of the switching points; and a driving body whose state is changed between state where said movable body is restricted to said lock position and state where the same is released in accordance with a predetermined condition when said first switch portion or said second switch portion is brought into a predetermined state, and is brought to state when said movable body is released from said restriction when said first switch portion is brought into said non-operation state, wherein a switching point of said first switch portion is disposed at the position at which said movable body is not restricted by said driving body, while a switching point of said second switch portion is disposed at the position at which said detent pin can be assuredly engaged with said lock recessed portion and also said movable body can be restricted by said driving body, a region in which said first switch portion can be actuated and a region in which said second switch portion can be actuated are in part overlapped, whereby state of said driving body is changed or another loading device is driven in accordance with that said second switch portion is actuated.

* * * * *